US011896541B2

(12) United States Patent
Tucker

(10) Patent No.: US 11,896,541 B2
(45) Date of Patent: Feb. 13, 2024

(54) MALE SEXUAL STIMULATION APPARATUS AND METHOD OF USE

(71) Applicant: Scott Tucker, Tarzana, CA (US)

(72) Inventor: Scott Tucker, Tarzana, CA (US)

( * ) Notice: Subject to any disclaimer, the term of this patent is extended or adjusted under 35 U.S.C. 154(b) by 321 days.

(21) Appl. No.: 17/222,540

(22) Filed: Apr. 5, 2021

(65) Prior Publication Data

US 2021/0307999 A1 Oct. 7, 2021

Related U.S. Application Data

(60) Provisional application No. 63/005,356, filed on Apr. 5, 2020.

(51) Int. Cl.
*A61H 19/00* (2006.01)
*A61H 23/00* (2006.01)

(52) U.S. Cl.
CPC ............. *A61H 19/32* (2013.01); *A61H 23/00* (2013.01); *A61H 2201/1635* (2013.01); *A61H 2205/087* (2013.01)

(58) Field of Classification Search
CPC .. A61H 19/32; A61H 2205/087; A61H 19/30; A61H 19/50
See application file for complete search history.

(56) References Cited

U.S. PATENT DOCUMENTS 5,466,235 A * 11/1995 Shubin, Sr. ............ A61H 19/32 600/38
6,149,580 A 11/2000 Dabney
7,553,159 B1 * 6/2009 Arnal .................. G09B 23/281 434/272
8,545,392 B2 10/2013 Standfest et al.
8,663,087 B2 3/2014 Kolar
9,114,057 B1 8/2015 Padilla
D827,851 S 9/2018 Pounders
10,123,933 B2 11/2018 Shao
10,258,537 B1 4/2019 Lamin
10,398,622 B2 9/2019 Dills
10,660,620 B2 * 5/2020 Wu .................... A61B 10/0058
2005/0027162 A1 * 2/2005 Paled ..................... A61H 19/44 264/222

(Continued)

OTHER PUBLICATIONS

Blush Novelties ("M for Men Ashley" https://www.amazon.com/Blush-Realistic-Masturbator-Waterproof-Vibrator/dp/B07G9VMNJK) (Year: 2019).*

(Continued)

*Primary Examiner* — Kaylee R Wilson
(74) *Attorney, Agent, or Firm* — Kameron W. Kramer

(57) ABSTRACT

A male stimulation apparatus, comprising: a housing defining a hand tunnel extending in a lateral direction and defining at least one hand hole to facilitate an entry of a hand of a user inside the hand tunnel; a phallus tunnel extending inside the housing from a first longitudinal end towards a second longitudinal end, the phallus tunnel extends through the hand tunnel and is adapted to receive a phallus of the user; and a vibrator shaft extending inside the housing from the second longitudinal end towards the first longitudinal end, the vibrator shaft extends through the hand tunnel and is adapted to receive a vibrator, wherein the hand tunnel facilitates the user to grasp the phallus tunnel and the vibrator shaft.

15 Claims, 8 Drawing Sheets

(56) References Cited

U.S. PATENT DOCUMENTS

| | | | | |
|---|---|---|---|---|
| 2008/0207991 | A1* | 8/2008 | Nan | A61H 23/02 600/38 |
| 2012/0232335 | A1 | 9/2012 | Eisenberg et al. | |
| 2013/0245366 | A1 | 9/2013 | Rhodes et al. | |
| 2013/0253264 | A1 | 9/2013 | Canbulat | |
| 2014/0099858 | A1* | 4/2014 | Hernandez | A61H 19/40 446/385 |
| 2017/0135895 | A1 | 5/2017 | Jafri | |
| 2017/0231863 | A1 | 8/2017 | Murray | |
| 2017/0290735 | A1* | 10/2017 | Hernandez | G09B 23/30 |
| 2017/0367924 | A1 | 12/2017 | Nan | |
| 2022/0096316 | A1* | 3/2022 | Mehrgan | A61H 19/34 |

OTHER PUBLICATIONS

Blush Novelties M for Men catalog available at http://blog.blushnovelties.com/blush-catalogs-sell-sheets/ (Year: 2019).*

Perfect Fit Brand ("The Art of Stroking: Perfect Fit Male Masturbator, is You Guessed it . . . ", https://perfectfitbrand.com/news/post/the-art-of-stroking/) (Year: 2018).*

Written Opinion of the International Searching Authority, International Searching Authority, dated Jul. 12, 2021.

International Search Report, Patent Cooperation Treaty, dated Jul. 12, 2021.

Search Strategy and Results, Patent Cooperation Treaty, dated Jul. 12, 2021.

* cited by examiner

MALE SEXUAL STIMULATION APPARATUS AND METHOD OF USE

CROSS-REFERENCE TO RELATED APPLICATION

This application claims the benefit of U.S. Provisional Patent Application Ser. No. 63/005,356 filed Apr. 5, 2020, titled "MALE SEXUAL STIMULATION APPARATUS AND METHOD OF USE" and the subject matter thereof is incorporated herein by reference thereto.

TECHNICAL FIELD

The present invention relates generally to devices for male sexual stimulation.

BACKGROUND ART

Sexual stimulation devices are abundant in the prior art, for both men and women. Specifically, there are many prior art devices for male sexual stimulation. U.S. Pat. No. 5,466,235, Shubin, Sr., entitled "Female Functional Mannequin" discloses a functional female mannequin in the shape of a female torso with a cavity for the insertion of the man's phallus. Devices such as this lack certain elements such as the ability to better regulate the pressure on and around the phallus. Additionally, devices such as this generally are not conducive to partners using them jointly.

Other prior art exists that are more focused on the grip on and around the phallus, such as U.S. Pat. No. 9,114,057 B1, Padilla, entitled "Masturbatory Device" is on such device. The device that Padilla discloses comprises a masturbatory glove that is meant to simulate a woman's vagina. Although this does allow for the user to regulate the pressure on and around the phallus, it is intended to be used solely.

U.S. Pat. No. 8,663,087 B2, Kolar, entitled "Compact Expandable Erogenic Stimulation Device for Men" is another device that provides sexual stimulation for men. The device disclosed by Kolar provides a female pelvic region and buttocks filled with warm water that a man can insert their phallus into. This device does not allow for the pressure around the phallus to be controlled by the hand as the all pressure is simply provided by the device itself.

Despite the abundance of sexual stimulation devices, there is a shortage of devices of apparatuses that are aimed at providing sexual stimulation of a male that is easy to use, allows for the pressure on and around the phallus to be regulated, and may be used with couples. The prior art invention overcomes the shortcoming contained in the prior art by providing a male sexual stimulation device that may be used by the individual seeking stimulation or it may be controlled by a partner. Additionally, the present invention provides many benefits, including, but not limited to, ease of use, level of vibration put on the phallus, and the level of pressure on and around the phallus may be easily controlled as desired.

Certain embodiments of the invention have other steps or elements in addition to or in place of those mentioned above. The steps or element will become apparent to those skilled in the art from a reading of the following detailed description when taken with reference to the accompanying figures.

DETAILED DESCRIPTION OF THE INVENTION

Figure 1:
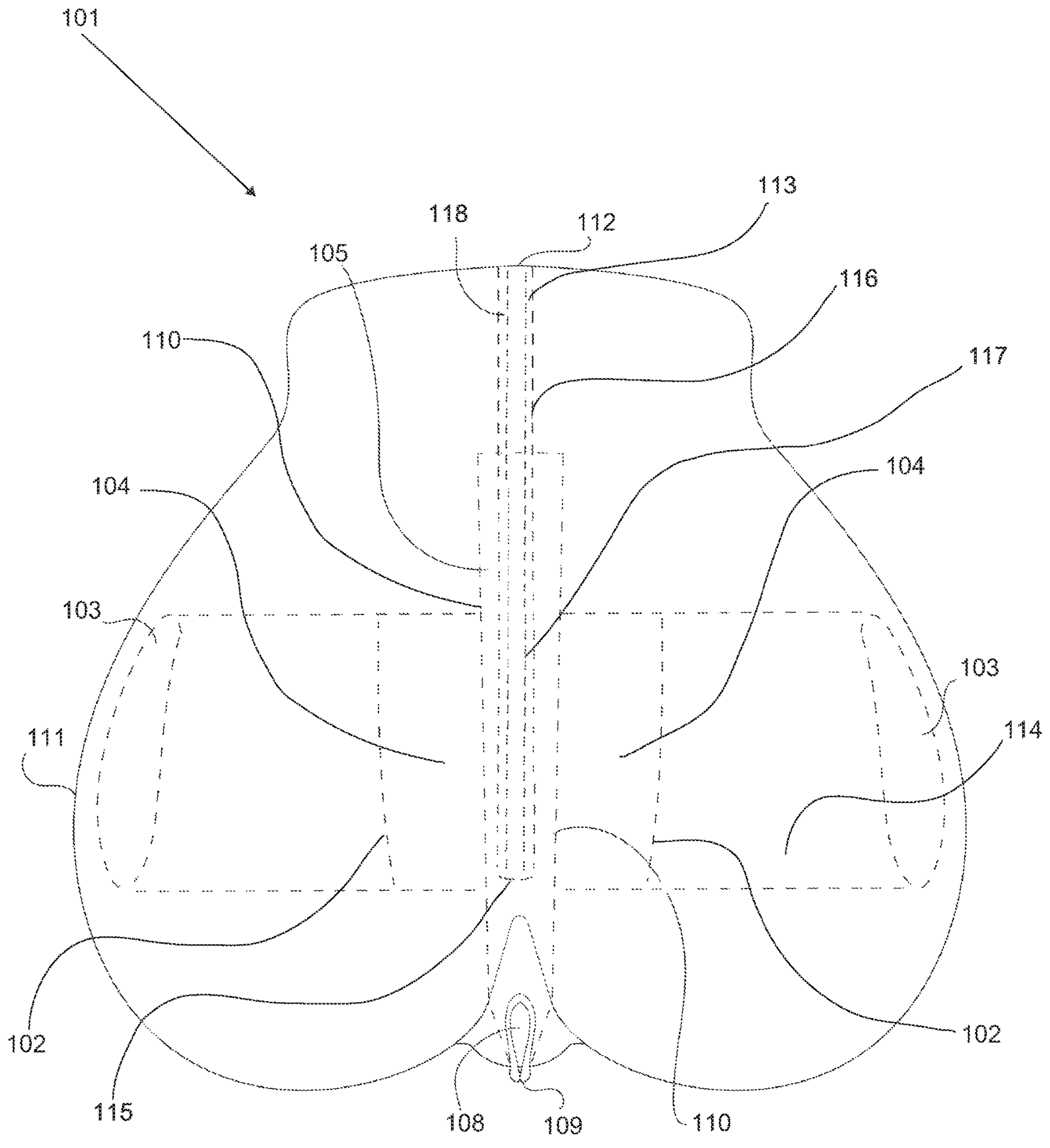
FIG. 1 illustrates a front cut-away view of the male stimulation apparatus.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system are semi-diagrammatic and not to scale and, particularly, some of the dimensions are for the clarity of presentation and are shown exaggerated in the drawing figures.

For expository purposes, the term "horizontal" as used herein is defined as a plane parallel to the plane or surface of the male stimulation apparatus, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures. The same numbers are used in all the drawing figures to relate to the same elements. Alternate embodiments have been included throughout, and the order of such are not intended to have any other significance or provide limitations for the present invention.

The present invention comprises a masturbation apparatus, comprising of a housing, wherein said housing further comprises a hole for the insertion of a phallus extending into the device in a tunnel and is enclosed by the apparatus, a hole for the insertion of a vibrator extending into the device in an tunnel and is enclosed by the apparatus, and at least one side of the device being open, exposing the shaft containing the phallus and shaft containing the vibrator, allowing for the shafts to be grasped by a user's hand.

Once the phallus is inserted into the apparatus of the present invention, a hand may be put into the apparatus via either of two opposing openings and the hand is able to wrap around the phallus and the vibrator. It is also possible to have two hands enter from opposite sides to grasp the phallus. Once a hand is inserted into the apparatus's opening, the hand, wrist, and/or arm partially support the weight of the apparatus. This facilitates the stroking movement that most often brings pleasure to a man's phallus while reducing the workload to the man's hand by spreading the full weight of the product over a larger surface area (e.g., surface area of hand+wrist+arm is greater than the surface area of hand alone). The hand will not directly touch the phallus, but instead the phallus will be in a non-rigid, pliable tube in the device. Vibration may intensify the stimulation of the phallus. The device can be used with or without a vibrator inserted into the vibrator shaft, as desired by the user.

FIG. 1 illustrates a front cut-away view of male stimulation apparatus 101. A phallus is inserted into opening 108 and further extends into male stimulation apparatus 101 through phallus tunnel 105. Female genital substitute 109 is meant to simulate a female's vagina. A user's hand may go into the male stimulation apparatus 101 through hand holes 103. Hand holes 103 extend through the entirety of male stimulation apparatus 101 and create hand tunnel 114. Phallus tunnel 105 extends through hand tunnel 114. Phallus tunnel interior wall 110 and phallus tunnel outer wall 102 create phallus tunnel interior cushion 104 that surrounds the phallus when phallus has been inserted in phallus tunnel 105. Phallus tunnel outer wall 102 of phallus tunnel interior cushion 104 is exposed allowing for a user's hand to grasp phallus tunnel 105 all the way around.

Upper opening 112 allows for a vibrator to be inserted into male stimulation apparatus 101 via vibrator shaft 113. Vibrator shaft 113 extends parallel to phallus tunnel 105. Vibrator shaft 113 extends through hand tunnel 114 and terminates with a closing at vibrator shaft end point 115. Vibrator shaft interior wall 117 and vibrator shaft outer wall 116 create vibrator shaft interior cushion 118 that surrounds the vibrator when vibrator has been inserted in vibrator shaft 113. Vibrator shaft outer wall 116 of vibrator shaft interior cushion 118 is exposed allowing for a user's hand to grasp vibrator shaft 113 all the way around. A user's hand may grasp phallus tunnel 105 and vibrator shaft 113 simultaneously. Phallus tunnel 105 and vibrator shaft 113 are separate shafts.

Male stimulation apparatus outer edge 111 is in the shape of the pelvic region of a woman but may be any shape as desired.

Figure 2:
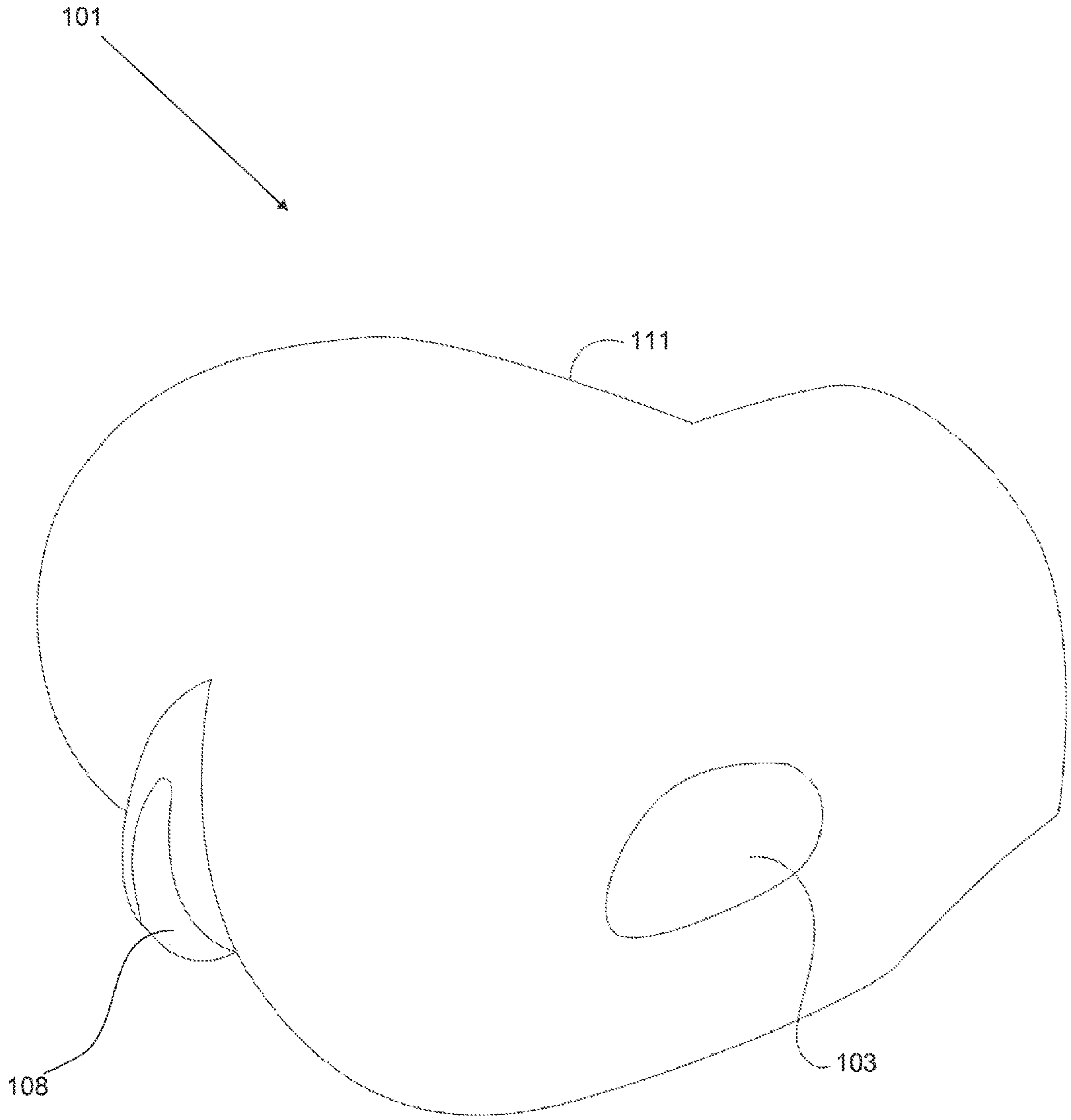
FIG. 2 illustrates a perspective view of the male stimulation apparatus.

FIG. 2 illustrates a perspective view of male stimulation apparatus 101. Right hand hole 103 is in view.

Figure 3:
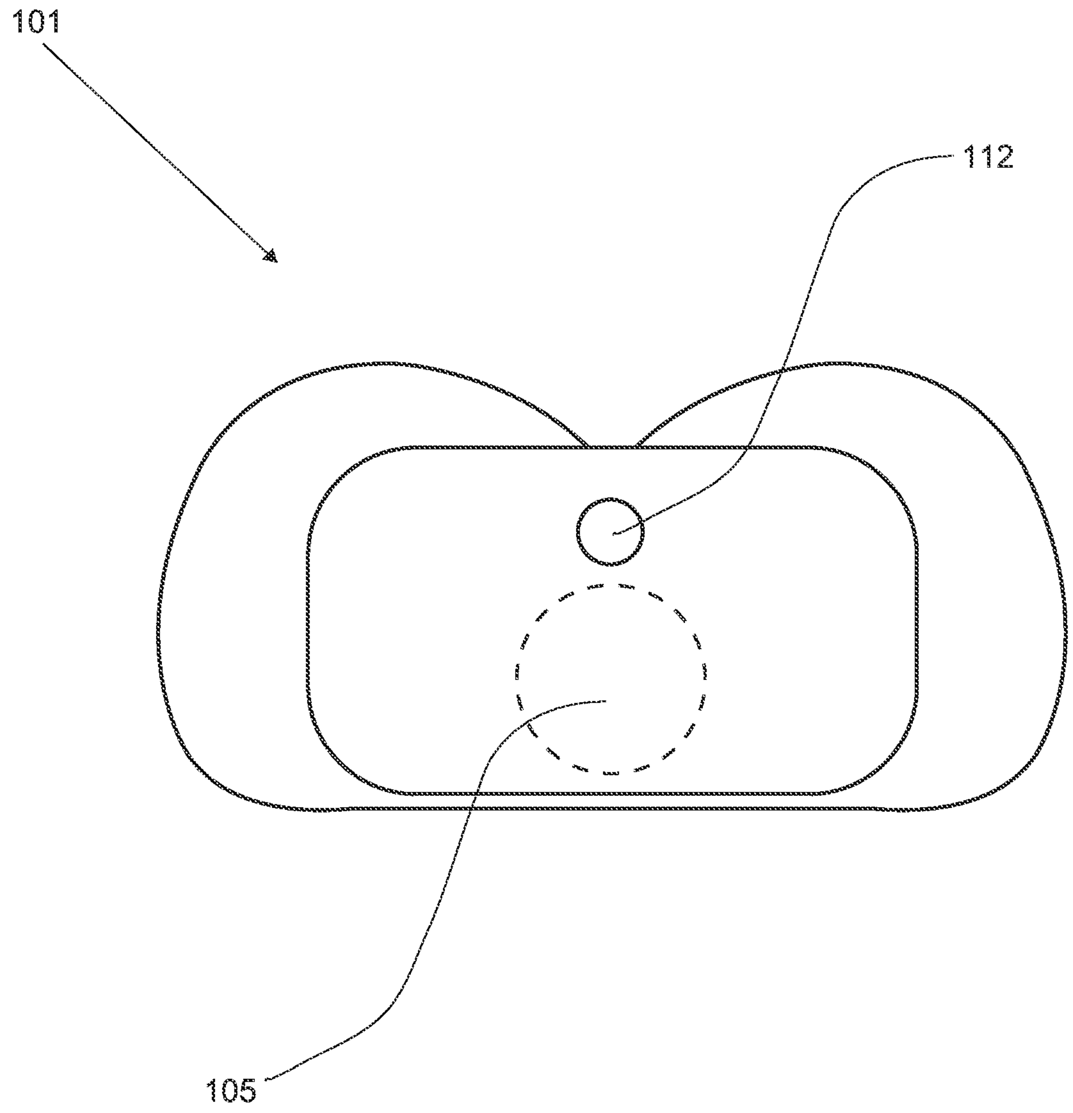
FIG. 3 illustrates a top down view of the male stimulation apparatus.

FIG. 3 illustrates a top down view of male stimulation apparatus 101. The orientation of upper opening 112 and phallus tunnel 105 is shown. A vibrator or other stimulation device may be inserted into upper opening 112 and sits alongside phallus tunnel 105 in order to provide maximum vibration and stimulation to the phallus.

Figure 4:
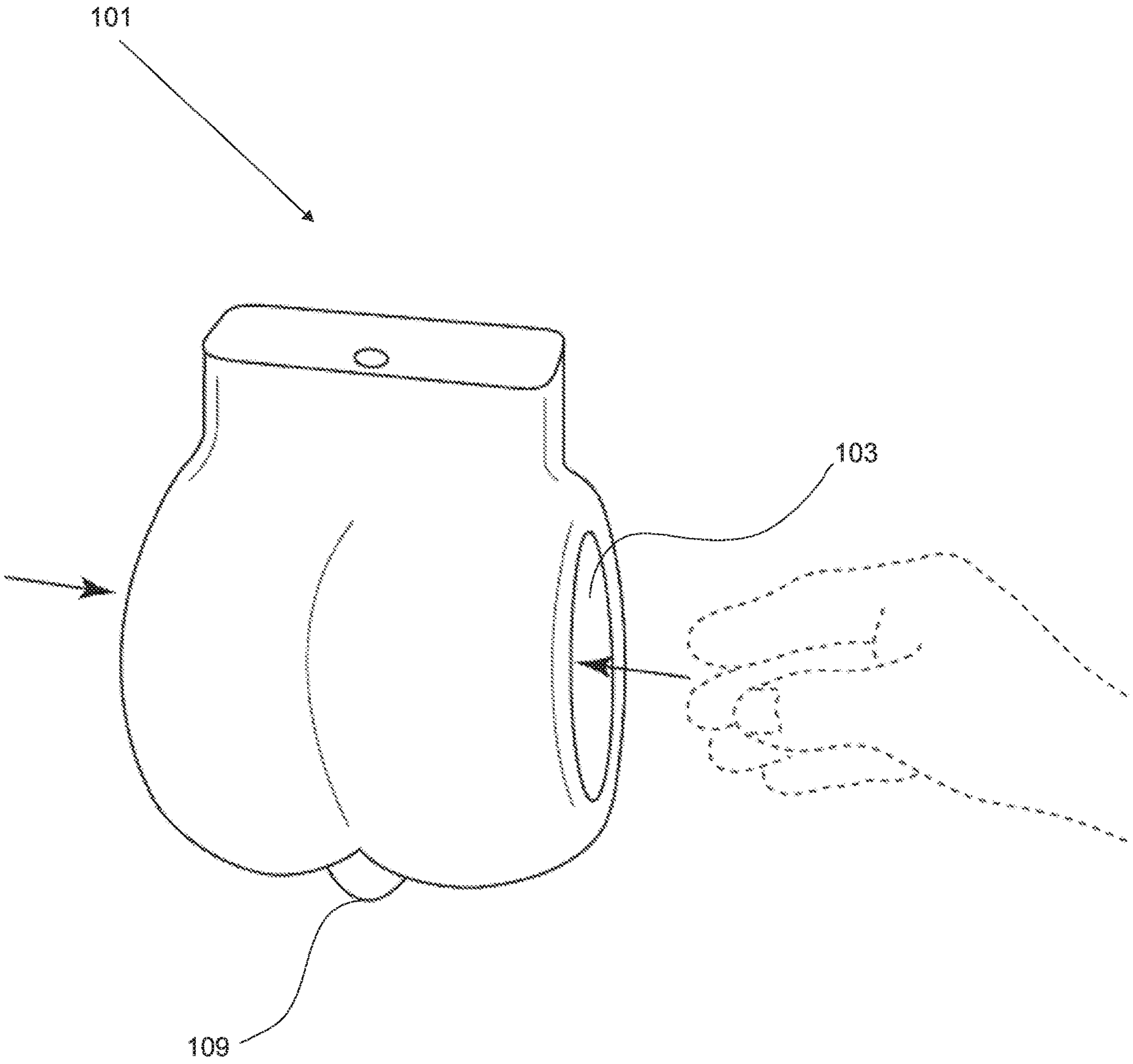
FIG. 4 illustrates a perspective view of the male stimulation apparatus with a hand about to enter.

FIG. 4 illustrates a perspective view of male stimulation apparatus 101 with a hand about to enter.

Figure 5:
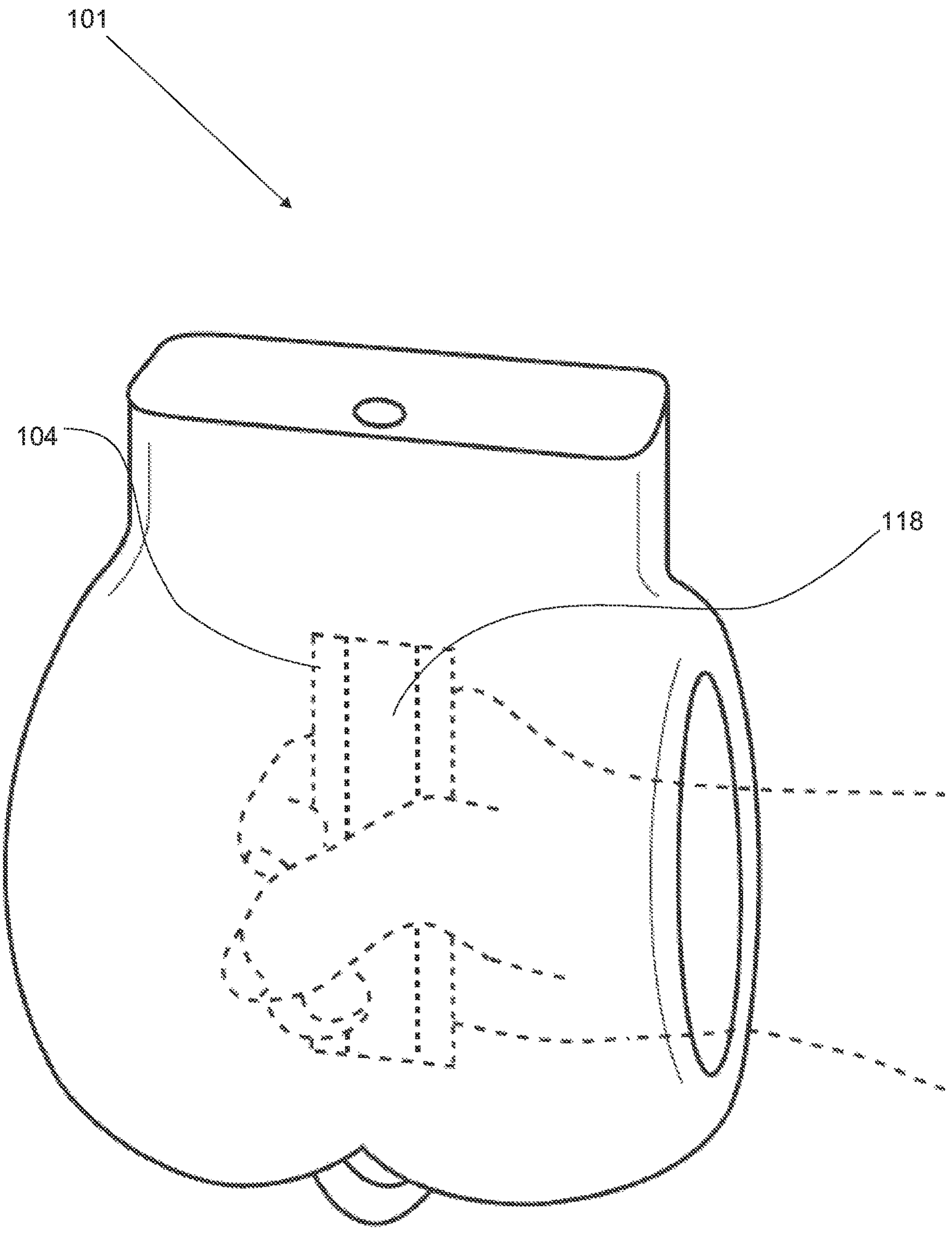
FIG. 5 illustrates a perspective view of the male stimulation apparatus with a hand grasping phallus tunnel interior cushion and vibrator shaft.

FIG. 5 illustrates a perspective view of male stimulation apparatus 101 with a hand grasping phallus tunnel interior cushion 104 and vibrator shaft interior cushion 118. For simplicity purposes, only the parts of phallus tunnel 105 and vibrator shaft 113 that are in contact with the user's hand or hands are shown.

Figure 6:
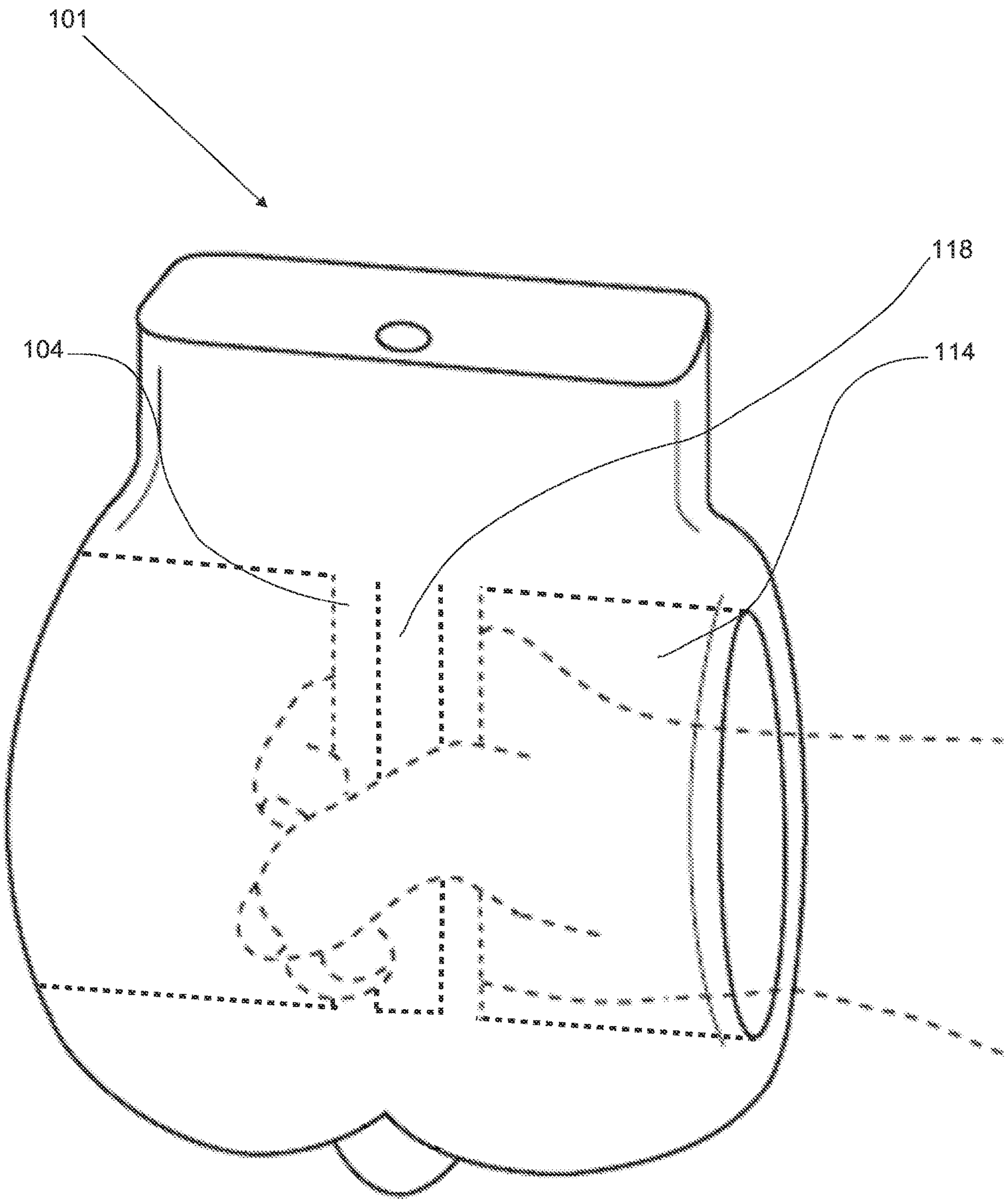
FIG. 6 illustrates a perspective view of the male stimulation apparatus showing hand tunnel and a hand grasping phallus tunnel interior cushion and vibrator shaft.

FIG. 6 illustrates a perspective view of male stimulation apparatus 101 with a hand grasping phallus tunnel interior cushion 104 and vibrator shaft interior cushion 118. Hand tunnel 114 is also shown. In this drawing, the hand is entering from the right side of male stimulation apparatus 101, but the hand could enter from the left side. Additionally, hand could enter from both sides of male stimulation apparatus 101 simultaneously. When a vibrator is inserted into vibrator shaft 113 the vibrator does not come into direct contact with a phallus that is in phallus tunnel 105. The user grasps both vibrator shaft 113 and phallus tunnel 105 and may control the level of pressure on the phallus. By squeezing vibrator shaft 113 more firmly, the amount of vibration put onto the phallus is increased. The user may choose not to insert a vibrator into vibrator shaft 113.

Figure 7:
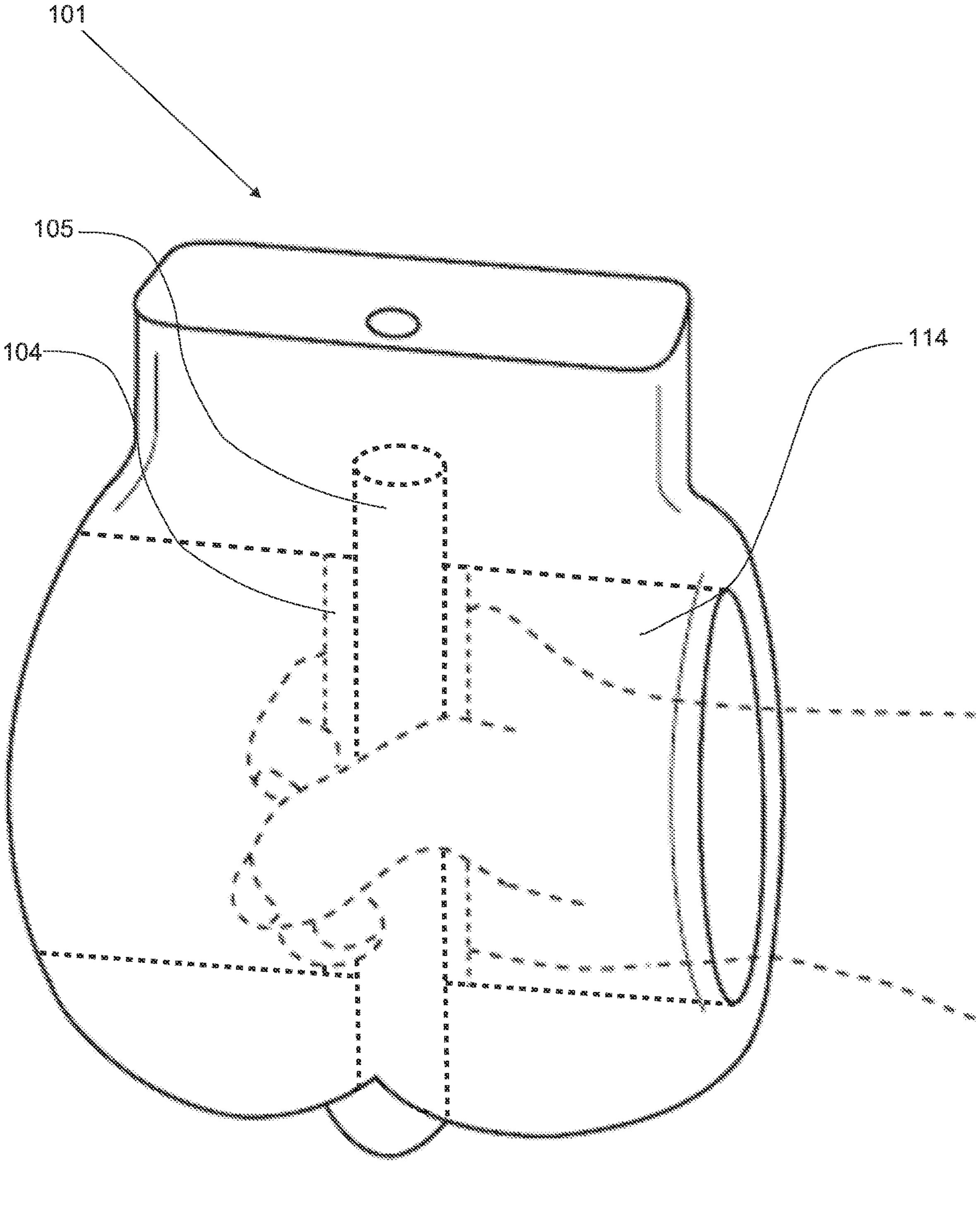
FIG. 7 illustrates a perspective view of the male stimulation apparatus showing hand tunnel and phallus tunnel with a hand grasping phallus tunnel interior cushion.

FIG. 7 illustrates a perspective view of male stimulation apparatus 101 with a hand grasping phallus tunnel interior cushion 104. This drawing also shows phallus tunnel 105 which is disposed in phallus tunnel interior cushion 104. The user's hand may control the level of pressure on the phallus. For simplicity purposes, vibrator shaft 113 is not shown in this Figure, but it is still present.

Figure 8:
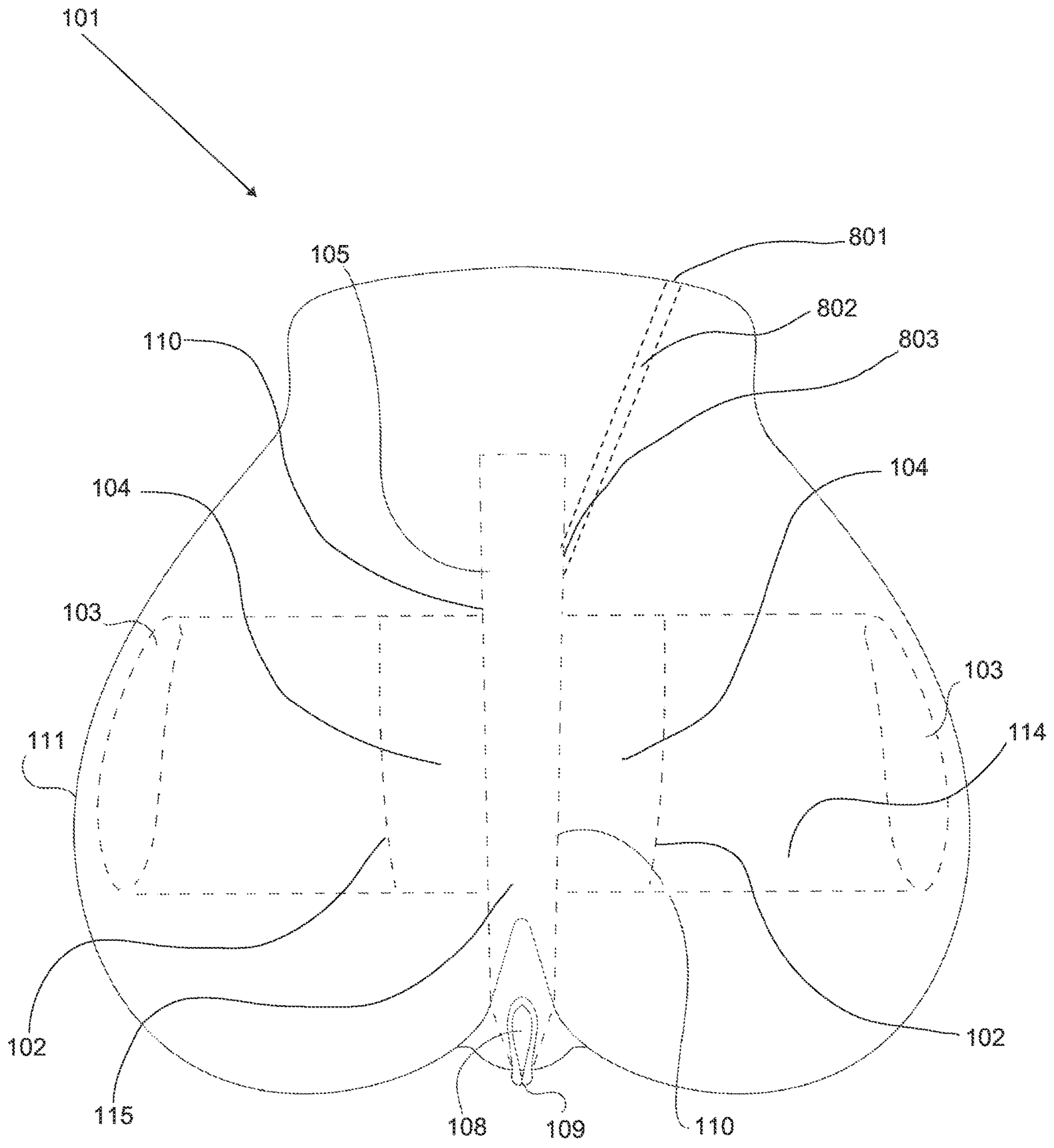
FIG. 8 illustrates a front cut-away view of the male stimulation apparatus with a lubricant shaft.

FIG. 8 illustrates a front cut-away view of male stimulation apparatus 101 with lubricant shaft 802. Lubricant opening 801 allows for lubricant to be inserted into lubricant shaft 802. Lubricant shaft 802 extends into phallus tunnel 105 at phallus lubricant opening 803 and provides lubricant to the phallus as desired. For simplicity purposes, vibrator shaft 113 is not shown in this Figure, but it is still present.

Male stimulation apparatus 101 is preferably composed of a soft, pliable material such as high-density polyethylene (HDPE) allowing for the insertion of the phallus, while still maintaining friction and to allow for the user to grasp phallus tunnel 105 and vibrator shaft 113 simultaneously and provide pressure and vibrations on the phallus. Male stimulation apparatus 101 may comprise other any material that provides the desired effects.

In one embodiment of the present invention, female genital substitute 109 may comprise an anus substitute.

In one embodiment of the present invention, male stimulation apparatus 101 may contain a female genital substitute 109 and an anus or other substitute. This would require a second hole near the opening 108 which would also allow the phallus to enter phallus tunnel 105. A second phallus tunnel may also be included that would run parallel to phallus tunnel 105.

Although the Figures show the male stimulation apparatus 101 in the shape of female genitalia, female genital substitute 109 of the male stimulation apparatus 101 may be any number of shapes, including, but not limited to, anal cavity, lips, a non-sexual simple-rounded shape, and/or round or any other geometric shape (tube, cylinder, decorated, or otherwise).

In one embodiment of the present invention, phallus tunnel 105 extends completely through male stimulation apparatus 101 thus allowing the tip of the phallus to extend past male stimulation apparatus outer edge 111.

In one embodiment of the present invention, phallus tunnel 105 of male stimulation apparatus 101 is modified to simulate any type of cavity as desired.

In one embodiment of the present invention, male stimulation apparatus 101 comprises a vibrating function and/or warming mechanism.

In one embodiment of the present invention, phallus tunnel interior cushion 104 contains any number or size of openings that extend to through phallus tunnel interior wall 110 and allow for the user to directly touch the phallus when the phallus is disposed in phallus tunnel 105.

In one embodiment of the present invention, hand holes 103 have reduced apertures or diameters which would stretch to accommodate the user's wrist and arm, but then securely tether to the user during manipulation and masturbation.

In one embodiment of the present invention, hand holes 103 are constructed with wider or larger openings and said design would not be as tight or restrictive to the user's arm or hand. In that case, however, the hand would still be fully or mostly obscured from view of the user. Another benefit of the present invention is that it stimulates the user by obscuring the hands and thus improving the fantasy of the user.

In one embodiment of the present invention, hand holes 103 of the present invention may be any size or shape as desired such that the hand, fingers, and wrist, or any part of any of them, are partially or fully enclosed and hidden from view of the user.

In one embodiment of the present invention, male stimulation apparatus 101 extends further up the user's arm. This further hides/obscures the view of the arm from the user when in use.

In one embodiment of the present invention, additional tunnels that from male stimulation apparatus outer edge 111 lead to phallus tunnel 105 to allow lubricant to be inserted.

In one embodiment of the present invention, the vibrator opening may be located on the bottom of male stimulation apparatus 101.

Male stimulation apparatus 101 thus may be fitted into any number of other housings, including, but not limited to, full size dolls.

Male stimulation apparatus 101 may easily be worn on the phallus of one person and operated by a second person.

The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying drawings are to be interpreted in an illustrative and non-limiting sense.

What is claimed is:

1. A male stimulation apparatus housing, comprising:

a hand tunnel extending from a first lateral end towards a second lateral end of the housing, a hand tunnel opening to facilitate entry of a hand of a user inside the hand tunnel, wherein the hand tunnel opening is arranged at the first lateral end of the housing, wherein the hand tunnel is sized to accommodate and fully enclose the entirety of the user's hand, a phallus tunnel extending from a first longitudinal end towards a second longitudinal end of the housing, wherein the phallus tunnel extends through the hand tunnel, a phallus tunnel opening to facilitate entry of a phallus of the user inside the phallus tunnel, wherein the phallus tunnel opening is arranged at the first longitudinal end of the housing, a genital substitute disposed at a first longitudinal end of the phallus tunnel and the phallus tunnel opening extends through the genital substitute, a vibrator shaft extending from the second longitudinal end towards the first longitudinal end of the housing, wherein the vibrator shaft extends through the hand tunnel and is adapted to receive a vibrator, a vibrator shaft opening to facilitate entry of the vibrator inside the vibrator shaft, wherein the vibrator shaft opening is arranged at the second longitudinal end of the housing, and wherein the hand tunnel facilitates the user to grasp the phallus tunnel and the vibrator shaft.

2. The male stimulation apparatus of claim 1, wherein the phallus tunnel includes a phallus tunnel interior wall, a phallus tunnel outer wall, and a phallus tunnel interior cushion arranged between the phallus tunnel interior wall and the phallus tunnel outer wall and adapted to surround the phallus when phallus is inserted inside the phallus tunnel.

3. The male stimulation apparatus of claim 1, wherein the vibrator shaft includes a vibrator shaft interior wall, a vibrator shaft outer wall, and a vibrator shaft interior cushion arranged between the vibrator shaft interior wall and the vibrator shaft outer wall and adapted to surround the vibrator when vibrator is inserted inside the vibrator shaft.

4. The male stimulation apparatus of claim 1, wherein the vibrator shaft extends parallel to the phallus tunnel and is arranged at an offset from the phallus tunnel.

5. The male stimulation apparatus of claim 1, wherein the genital substitute simulates a female's vagina.

6. The male stimulation apparatus of claim 1, wherein the genital substitute simulates an anus.

7. The male stimulation apparatus of claim 1 further including an outer edge having a shape of a pelvic region of a woman.

8. The male stimulation apparatus of claim 1 wherein the hand tunnel opening includes a pair of hand holes disposed spaced apart and opposite to each other.

9. A male stimulation apparatus housing, comprising:

a hand tunnel extending from a first lateral end towards a second lateral end of the housing;

at least one hand tunnel opening to facilitate entry of a hand of a user inside the hand tunnel, wherein the at least one hand tunnel opening is arranged at the first lateral end of the housing, wherein the hand tunnel is sized to accommodate and fully enclose the entirety of the user's hand;

a phallus tunnel extending from a first longitudinal end towards a second longitudinal end of the housing, wherein the phallus tunnel extends through the hand tunnel, a phallus tunnel opening to facilitate entry of a phallus of the user inside the phallus tunnel, the phallus tunnel opening is arranged at the first longitudinal end of the housing, the phallus tunnel includes a phallus tunnel interior wall, a phallus tunnel outer wall, and a phallus tunnel interior cushion arranged between the phallus tunnel interior wall and the phallus tunnel outer wall and adapted to surround the phallus when phallus is inserted inside the phallus tunnel;

a vibrator shaft extending from the second longitudinal end towards the first longitudinal end of the housing, wherein the vibrator shaft extends through the hand tunnel and is adapted to receive a vibrator, a vibrator shaft opening to facilitate entry of the vibrator inside the vibrator shaft, wherein the vibrator shaft opening is arranged at the second longitudinal end of the housing, the vibrator shaft includes a vibrator shaft interior wall, a vibrator shaft outer wall, and a vibrator shaft interior cushion arranged between the vibrator shaft interior wall and the vibrator shaft outer wall and adapted to surround the vibrator when vibrator is inserted inside the vibrator shaft, and wherein the hand tunnel facilitates the user to grasp the phallus tunnel and the vibrator shaft.

10. The male stimulation apparatus of claim 9, wherein the vibrator shaft extends parallel to the phallus tunnel and is arranged at an offset from the phallus tunnel.

11. The male stimulation apparatus of claim 9 further including a genital substitute arranged at the first longitudinal end and the opening of the phallus tunnel extends through the female substitute.

12. The male stimulation apparatus of claim 11, wherein the genital substitute simulates a female's vagina.

13. The male stimulation apparatus of claim 11, wherein the genital substitute simulates an anus.

14. The male stimulation apparatus of claim 9 further including an outer edge having a shape of a pelvic region of a woman.

15. The male stimulation apparatus of claim 9 wherein the at least one hand tunnel opening includes a pair of hand holes disposed spaced apart and opposite to each other.

* * * * *